United States Patent
Larchuk

(10) Patent No.: US 6,753,993 B1
(45) Date of Patent: Jun. 22, 2004

(54) PASSIVE OPTICAL WAVELENGTH CONVERTER

(75) Inventor: Todd S. Larchuk, Aberdeen, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/449,318

(22) Filed: May 30, 2003

(51) Int. Cl.[7] .............................. G02F 1/03; G02F 1/07
(52) U.S. Cl. ................. 359/244; 359/258; 359/246
(58) Field of Search .................. 359/238, 245, 359/246, 258, 251, 252, 259, 244; 385/15, 9; 398/41–3, 47–8, 75, 79, 95

(56) References Cited

U.S. PATENT DOCUMENTS

| | | | |
|---|---|---|---|
| 4,882,775 A | * 11/1989 | Coleman ..................... | 398/43 |
| 5,126,870 A | * 6/1992 | Murphy et al. ............... | 398/79 |
| 5,798,853 A | * 8/1998 | Watanabe .................... | 398/150 |
| 5,978,129 A | 11/1999 | Jourdan et al. ............... | 359/326 |
| 6,069,732 A | 5/2000 | Koch et al. .................. | 359/344 |
| 6,208,454 B1 | 3/2001 | Koren et al. ................. | 359/326 |
| 6,215,576 B1 | * 4/2001 | Minemoto et al. ........... | 359/245 |
| 6,259,552 B1 | 7/2001 | Boffi et al. ................... | 359/332 |
| 6,535,312 B2 | 3/2003 | Hajjar et al. ................. | 359/128 |
| 6,535,542 B1 | * 3/2003 | Cao ............................. | 372/98 |

* cited by examiner

*Primary Examiner*—Jordan M. Schwartz
*Assistant Examiner*—Jessica Stultz

(57) ABSTRACT

Apparatus for wavelength conversion includes a first optical be splitter, a first leg and a second leg each splitting from the first optical beam splitter, a first optically passive nonlinear device disposed in the first leg, a second optically passive nonlinear device disposed in the second leg and a second optical beam splitter joining the two legs beyond the optically passive nonlinear devices. An unmodulated optical signal splits between the two legs. When no other beam is in the second leg, all optical signals exit the second beam splitter at a first port. When another (modulated) beam is imparted to the optically passive nonlinear device in the second leg, an imbalance is created at the second beam splitter such that some portion of the unmodulated optical signal exits at a second port of the second beam splitter in a modulated manner.

24 Claims, 3 Drawing Sheets

PASSIVE OPTICAL WAVELENGTH CONVERTER

FIELD OF INVENTION

This invention relates to optical transmission systems and, more particularly, to devices which perform wavelength conversion of optical signals from a first wavelength to a second wavelength.

BACKGROUND OF INVENTION

Optical devices such as wavelength shifters and wavelength converters have been used to "change the wavelength" of an optical data signal in optical transmission systems. This change in the wavelength is more properly exemplified as a transfer of data or information from a carrier signal at a first wavelength to a different carrier signal at a second wavelength. Wavelength shifters or converters are integrated into lightwave transmission networks as such networks employ wavelength division multiplexing and wavelength routing of optical signals. The shifters or converters help to overcome the capacity limitations of such networks by rearranging (wavelength channel interchange) and reallocating the optical wavelength channels for efficient use of the limited optical bandwidth of the network.

Optical wavelength conversion has been demonstrated in the past by using a traveling wave semiconductor optical amplifier (SOA) which performs the conversion on intensity modulated optical signals by employing either four-wave mixing or the gain saturation effect. These devices suffer from common shortcomings. The signal extinction ratio (a ratio of the high level of a signal in the optical transmission system divided by the low level of said signal) on the converted signal and/or the conversion efficiency are neither very high nor attractive over a wide range of wavelengths without the expenditure of relatively high input signal power.

Semiconductor optical amplifiers have been used more recently in both Mach-Zehnder and Michelson interferometers to provide wavelength conversion. Amplifiers were arranged in both legs of each interferometer. These configurations exploit the phase shift caused by the refractive index variation associated with gain saturation in the optical amplifiers. As such, the interferometers transfer attendant phase modulation into an amplitude (intensity) modulated signal. This technique apparently operates at low power while improving the signal quality of the converted signal with respect to extinction ratio and chirp. However, both techniques employ SOAs which require the conversion of the optical signal into an electrical signal. Such conversion results in signal degradation or loss that is inherent in the physical devices that perform the conversion. The conversion devices also add cost, complexity and electrical delays in the systems in which they are integrated.

SUMMARY OF THE INVENTION

These and other deficiencies of the prior art are overcome according to the principles of the invention in an apparatus for wavelength conversion that includes a first optical beam splitter, a first leg and a second leg each splitting from the first optical beam splitter, a first optically passive nonlinear device disposed in the first leg, a second optically passive nonlinear device disposed in the second leg and a second optical beam splitter joining the first leg and second leg beyond the first and second optically passive nonlinear devices. The first and second optically passive nonlinear devices are slabs of nonlinear optical media and in one embodiment of the invention they are Kerr media.

The apparatus additionally has a first mirror in the first leg and a second mirror in the second leg. The first mirror is disposed between the first beam splitter and the first optically passive nonlinear device; the second mirror is disposed between the second optically passive nonlinear device and the second beam splitter.

The apparatus also has an optical source connected to the first beam splitter. The optical source generates an unmodulated optical signal. A condition is established in the apparatus wherein the unmodulated optical signal is split between the first leg and the second leg and where no other beam is in the second leg, all optical signals exit the second beam splitter at a first port. A second condition is established wherein the unmodulated optical signal is split between the first and second leg and where another beam is imparted to the optically passive nonlinear device in the second leg, an imbalance is created at the second beam splitter such that some portion of the unmodulated optical signal exits at a second port of the second beam splitter in a modulated manner.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The subject invention will be primarily described within the context of an optical wavelength shifting device which may be used in wavelength division multiplexed (WDM) and dense WDM (DWDM) optical communication systems. However, it will be appreciated by those skilled in the art that the invention may be advantageously employed in any optical communications system in which it is desirable to minimize components and costs in such systems when optical-electrical-optical conversion of signals in the system is not desirable.

Figure 1:
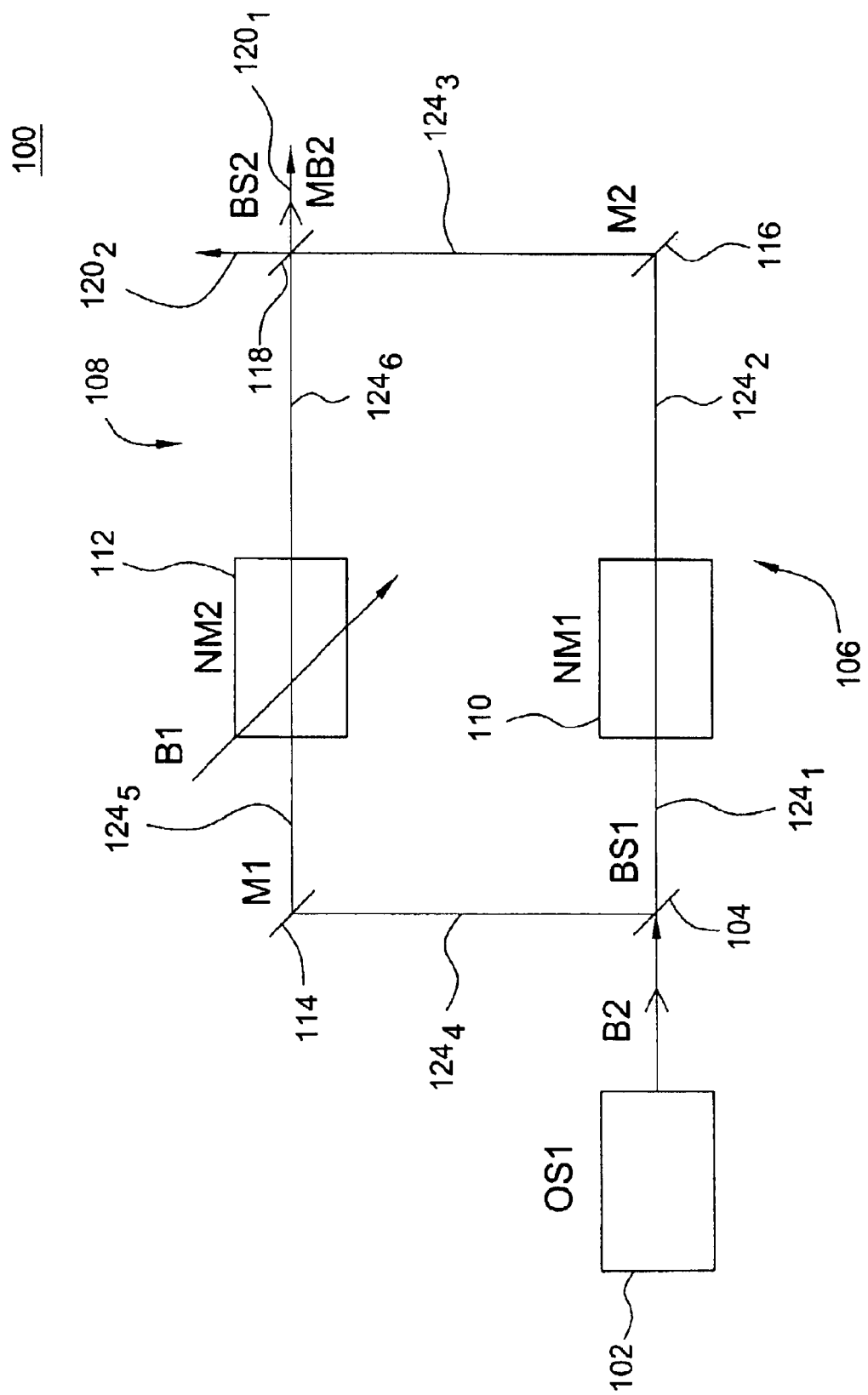
FIG. 1 depicts a schematic diagram of a wavelength shifting device in accordance with the subject invention.

FIG. 1 depicts a schematic diagram of an optical wavelength shifter in accordance with the present invention. The shifter 100 is a device adapted for receiving an unmodulated signal of a second carrier wavelength, a modulated signal of a first carrier wavelength, and outputting the information encoded on the first carrier signal onto the second carrier signal.

Wavelength shifter 100 includes a first beam splitter 104 adapted for connection to an unmodulated optical beam source 102. Unmodulated optical beam source 102 provides the second carrier wavelength upon which the data will eventually be modulated upon. A first optical communication path or leg 106 of the shifter 100 extends from first beam splitter 104 and acts as a control or balance leg for the shifter 100, which is described in greater detail below. The first leg 106 includes first nonlinear media 110 in optical communication with the first beam splitter 104 via a first optical fiber $124_1$. Although the interconnection of elements in the subject wavelength shifter 100 is described by optical fibers $124_n$, one skilled In the art will appreciate alternate methods of interconnections including using free space between each element with appropriate input and output couplers. The first nonlinear material 110 is subsequently in optical communication with a second mirror 116 via a second optical fiber $124_2$. Finally, first leg 106 terminates with second mirror 116 in optical communication with a second beam splitter (acting as a coupler or combiner) 118 via a third optical fiber $124_3$.

A second optical communication path or leg 108 extends from first beam splitter 104 and acts as a modulated leg. Second leg 108 includes a first mirror 114 in optical communication with first beam splitter 104 via fourth optical fiber $124_4$. First mirror 114 is subsequently in optical communication with second nonlinear material 112 via a fifth optical fiber $124_5$. The nonlinear material of the second nonlinear material 112 is substantially similar to the first nonlinear material 110. In one embodiment of the invention, nonlinear media 110 and 112 are Kerr media; however, one skilled in the art will realize that any type of optically nonlinear material displaying the desired characteristics may be substituted for Kerr media. For example, "engineered" materials, such as those created through CVD, MBE or other techniques, (possibly involving quantum dots), that have suitable optical characteristics, especially a nonlinearity exceeding those of existing known materials may be used in place of the Kerr media. Nonlinear materials such as organic liquids, organic glasses (such as Se-based chalcogenide glasses) are acceptable materials. Second leg 108 continues from second nonlinear material 112 via a sixth optical fiber $124_6$ and is in optical communication with second beam splitter (coupler/combiner) 118. One skilled in the art will realize that there are various configurations that can achieve the desired results. For example, the first and second legs 106 and 108 may be arranged substantially parallel to each other thus eliminating the need for first and second mirrors 114 and 116. The invention can be physically realized by incorporating the shifter 100 on a substrate (in one example, an InGaP substrate). In one embodiment, the substrate is micro-machined, and miniature cubes of nonlinear material are inserted and cemented in place. That way a micro-optical circuit hybrid can be fabricated out of integrated waveguides and cubes or beamsplitters of other nonlinear materials.

Second beam splitter 118 is so configured and adapted to receive input information from first leg 106 and second leg 108 and is also provided with two output ports: first output port $120_1$ and second output port $120_2$. Depending upon the state of the wavelength shifter, output signals will be available at by either first output port $120_1$ or second output port $120_2$ as described in greater detail below. Second nonlinear material 112 is so adapted and configured so as to receive an input modulated optical signal of a first carrier wavelength. That is, the data that is to be transposed from the first carrier wavelength to the second carrier wavelength is carried by input modulated beam B1 for eventual superposition or modulation upon unmodulated optical beam B2 from unmodulated optical source 102.

The wavelength shifter 100 comprises, illustratively, a Mach-Zehnder interferometer. The interferometer has a nonlinear characteristic by virtue of the first and second nonlinear media 110 and 112, respectively. When the interferometer is properly balanced, the unmodulated optical input beam B2 from optical source 102 exits the wavelength shifter 100 at second output port $120_2$ of second beam splitter 118. That is, when the interferometer is balanced, no light exits through the first port $1^{20}$, of second beam splitter I1 8. For example, when the input modulated beam B1 is off (denoting a "0") in a string of ones and zeros of digital data, the interferometer is balanced and no light exits from first output port $120_1$ (i.e., beams B1 and B2 constructively interfere with one another 100%). When the input beam B1 is on (denoting a logical "1" of digital data), a phase shift is induced in second nonlinear media 112 by beam B1 interacting therewith. The phase shift unbalances the interferometer, thus causing light from the unmodulated optical source 102 to exit the first output port $120_1$ of second beam splitter 118 (i.e., the constructive interference is reduced to less than 100%). It is noted that the maximum amount of light passing from the first output port $1^{20}$, corresponds to approximately a half wavelength of the beam B2. As such, the modulated input optical beam B1 controls the phase shift in the second leg 108 of the nonlinear interferometer (wavelength shifter 100) causing the unmodulated input beam B2 traveling through the first leg 106 to be modulated. The newly modulated beam MB2 then exits the interferometer as a copy of the modulation scheme seen in the originally modulated input optical beam B1.

The benefits realized by the subject invention are readily revealed to those skilled in the art and informed by the teachings of the present invention. Specifically, since there is no conversion of the optical signals to electrical signals such as is done in semiconductor optical amplifier shifter type devices, signal degradation or loss during the conversion process is eliminated. Additionally, the bandwidth of operation can be very large (on the order of several hundred nanometers) as long as the nonlinearities are "matched" in the two legs of the interferometer. Another advantage of the invention is that the output (newly modulated signal) is strong, even with a relatively weaker input signal (which may create a smaller induced optical phase shift, as long as the unmodulated optical source (source providing optical beam B1 in the specific description) is relatively strong.

Figure 2:
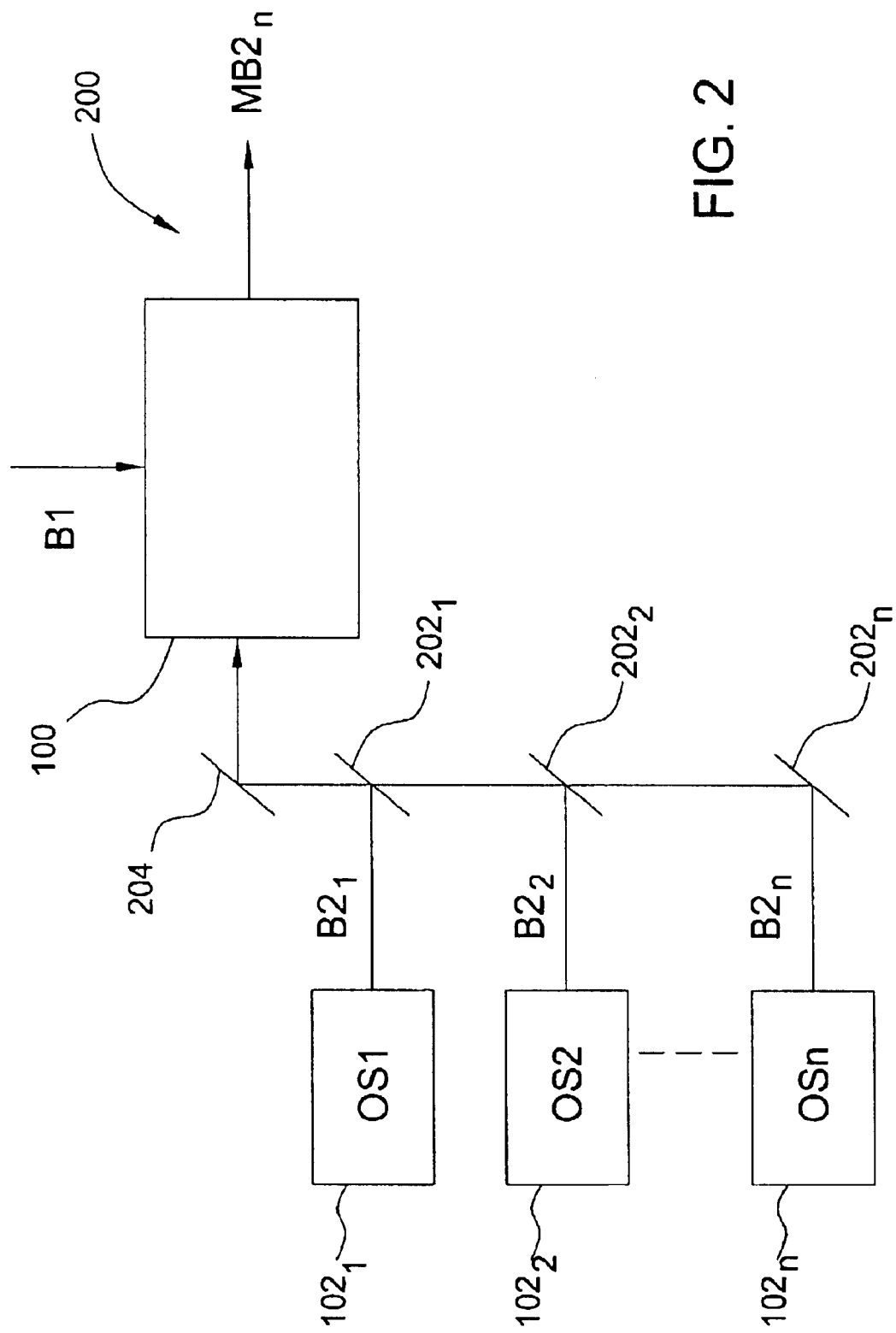
FIG. 2 depicts a schematic diagram of an optical switch incorporating the wavelength shifting device in accordance with the subject invention.

One specific application for the subject invention is to create an all optical switch having dense wavelength division signals (DWDM) as inputs and outputs. The switch allows for cross connection of signals from any wavelength of any input signal to any wavelength of any output signal. As such, the application and scaling of such a device is powerful (in its broad application) yet reasonable as it does not unduly add cost or complexity or additional electrical components to a system using such a high volume switch. For example, FIG. 2 shows one embodiment of such an all optical switch 200. The wavelength shifter 100 is adapted to receive the modulated input optical beam B1 as previously described. Additionally, the wavelength shifter 100 is also adapted to receive a plurality of unmodulated input beams $B2_1, B2_2 \ldots B2_n$ from a plurality of unmodulated optical beam sources $102_1, 102_2 \ldots 102_n$. Each such unmodulated optical beam source $102_n$ is connected to the wavelength shifter 100 via a corresponding optical source switch mirror $202_n$. That is, depending upon which unmodulated beam is desired to become the output modulated beam, a corresponding switch $202_n$ is activated to bring the beam $B2_n$ into directional alignment with the wavelength shifter 100 via input mirror 204. In one embodiment, the mirror switches $202_n$ are moveable micromirrors oriented in an arrayed fashion as shown in FIG. 2. Other commonly employed methods for selective wavelength introduction into an optical opponent are also possible to those skilled in the art. The wavelength shifter 100 operates in an substantially similar method to that described above once the desired unmodulated beam $B2_n$ is selected thereby outputting a modulated beam $B2_n$ corresponding in wavelength to unmodulated beam $B2_n$ and having the modulation characteristics of input modulated beam B1.

Figure 3:
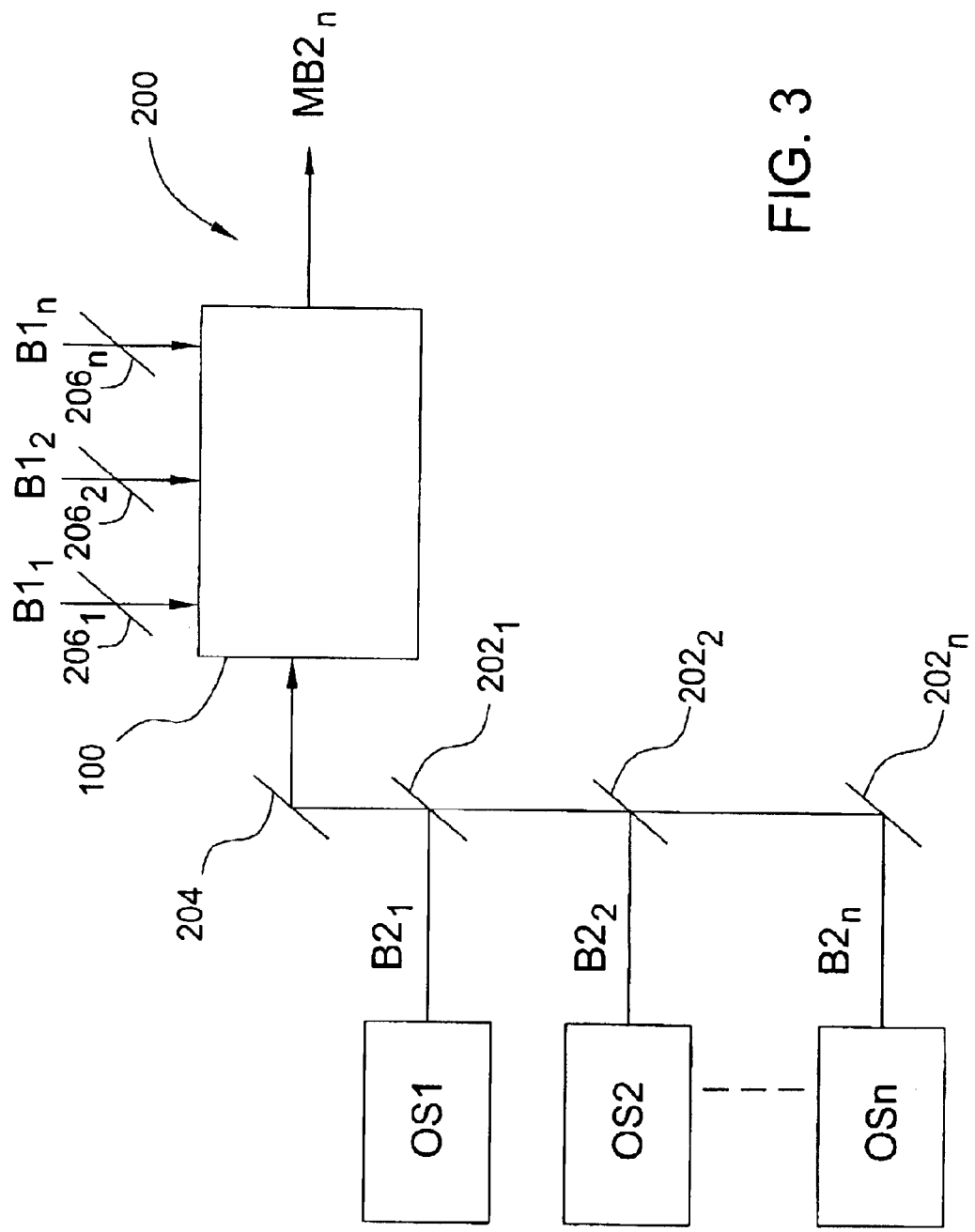
FIG. 3 depicts a schematic diagram of a second embodiment of the optical switch incorporating the wavelength shifting device in accordance with the subject invention.

One skilled in the art can also appreciate that such an optical switch 200 can have an advanced configuration to accept multiple input modulated beams $B1_n$ to affect and even higher switching capability than the embodiment shown in FIG. 2. Specifically, FIG. 3 shows an optical switch 200 having a plurality of input modulated beams $B1_n$ controlled by a corresponding plurality of input beam controlled mirrors $206_n$ with the remaining portion of the switch 200 remaining substantially similar to that described in FIG. 2. In this manner, it is easily seen that any desired input modulated beam $B1_n$ (on any one of a desired number of corresponding wavelengths) may be selected to be shifted to any one of a number of unmodulated beams $B2_n$ (having a different wavelength). The resultant output modulated beam $MB2_n$ contains the modulated characteristics of the input beam $B1_n$ modulated on the wavelength of the previously unmodulated input beam $B2_n$. In either of the embodiments seen and described in FIGS. 2 and 3, optical mirror switches $202_n$ and $206_n$ can be controlled by any means known to those skilled in the art and, in one example, may be computer controlled based on the desirability of switching to various wavelengths to increase usable bandwidth or resolution of a particular portion of a bandwidth (channel) to establish a highly effective and dynamic tool for optical signal communication systems.

Although various embodiments that incorporate the teachings of the present invention have been shown and described in detail herein, those skilled in the art can readily devise many other varied embodiments that still incorporate these teachings.

What is claimed is:

1. Apparatus comprising:
   an optical beam splitter having a first leg and a second leg;
   a first optically passive nonlinear device disposed in the first leg;
   a second optically passive nonlinear device disposed in the second leg; and
   an optical coupler for combining outputs from the first and second optically passive nonlinear devices;
   wherein an unmodulated optical signal, having a first wavelength, input into said optical beam splitter is split between the first and second leg and a modulated optical signal, having a second wavelength, input into said second optically passive nonlinear device is transmitted along the second leg, such that when the outputs from the first and second optically passive nonlinear devices are combined at least a portion of the unmodulated optical signal exits said apparatus comprising substantially the wavelength of said unmodulated optical signal and the modulation of said modulated optical signal.

2. The apparatus of claim 1 wherein the first and second optically passive nonlinear devices are slabs of nonlinear optical media.

3. The apparatus of claim 2 wherein the slabs of nonlinear optical media are Kerr media.

4. The apparatus of claim 2, wherein the nonlinear optical media is selected from the group consisting of organic liquids, organic glasses and engineered materials.

5. The apparatus of claim 1 further comprising a first mirror in the first leg and a second mirror in the second leg.

6. The apparatus of claim 5 wherein the first mirror is disposed between the beam splitter and the first optically passive nonlinear device.

7. The apparatus of claim 5 wherein the second mirror is disposed between the second optically passive nonlinear device and the optical coupler.

8. The apparatus of claim 1 further comprising at least one optical source connected to the beam splitter.

9. The apparatus of claim 8 wherein the at least one optical source generates said unmodulated optical signal.

10. The apparatus of claim 9 wherein the modulated optical signal is substantially comprised of logical lows such that a balance condition exists in the optical coupler and all optical signals exit the optical coupler at a first port.

11. The apparatus of claim 10 wherein the modulated optical signal causes an imbalance to exist at the optical couple such that the portion of the unmodulated optical signal exiting said apparatus exits at a second port of the optical coupler.

12. The apparatus of claim 8 wherein said at least one optical source is a plurality of optical sources outputting a plurality of corresponding unmodulated optical signals at a plurality of corresponding wavelengths.

13. The apparatus of claim 12 wherein each of said plurality of corresponding unmodulated optical signals are imparted to the beam splitter via a switch.

14. The apparatus of claim 13 wherein the switch is a moveable mirror which reflects the unmodulated optical signal to an input mirror.

15. The apparatus of claim 1 wherein the second optically passive nonlinear device is adapted to receive a plurality of input modulated signals.

16. The apparatus of claim 15 wherein the plurality of input modulated signals are selectively applied to the second optically passive nonlinear device via a corresponding plurality of optical switches.

17. The apparatus of claim 16 wherein the plurality of optical switches are moveable mirrors, one of each of said plurality of moveable mirrors being disposed in an input channel prior to the second optically passive nonlinear device.

18. Apparatus comprising:
   means for adapting a modulated optical signal having a first wavelength into a first leg of an optical interferometer, said first leg comprising a first optically passive nonlinear device;
   means for splitting an unmodulated optical signal having a second wavelength into the first leg and a second leg of the optical interferometer, said second leg comprising a second optically passive nonlinear device; and
   means for optically joining the first and second legs such that the unmodulated optical signal has the modulation scheme of the modulated optical signal at the second wavelength.

19. The apparatus of claim 18 wherein the means for adapting the modulated optical signal into the first leg is the first optically passive nonlinear device in the first leg.

20. The apparatus of claim 19 wherein the optically passive nonlinear device in the first leg is a slab of optically passive media.

21. The apparatus of claim 20 wherein the media slab is a Kerr media.

22. The apparatus of claim 18 wherein the means for splitting the unmodulated signal into the first leg and second leg of the optical interferometer is a beam splitter.

23. The apparatus of claim 18 wherein the means for optically joining the first and second legs is a second beam splitter that is disposed beyond the first nonlinear device.

24. Apparatus comprising:
- means for adapting a plurality of modulated optical signals, having a first set of wavelengths, into a first leg of an optical interferometer, said first leg comprising a first optically passive nonlinear device;
- means for adapting a plurality of unmodulated optical signals, having a second set of wavelengths, into the optical interferometer;
- means for splitting one of said plurality of unmodulated optical signals into the first leg and a second leg of the optical interferometer, said second leg comprising a second optically passive nonlinear device; and
- means for optically joining the first and second legs such that one of said plurality of unmodulated optical signals has the modulation scheme of one of the plurality of modulated optical signals.

* * * * *